US008420576B2

(12) United States Patent  (10) Patent No.: US 8,420,576 B2
Eoff et al.  (45) Date of Patent: Apr. 16, 2013

(54) HYDROPHOBICALLY AND CATIONICALLY MODIFIED RELATIVE PERMEABILITY MODIFIERS AND ASSOCIATED METHODS

(75) Inventors: Larry S. Eoff, Duncan, OK (US); B. Raghava Reddy, Duncan, OK (US); Eldon D. Dalrymple, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 209 days.

(21) Appl. No.: 12/538,203

(22) Filed: Aug. 10, 2009

(65) Prior Publication Data

US 2011/0034351 A1 Feb. 10, 2011

(51) Int. Cl.
C09K 8/60 (2006.01)
C09K 8/588 (2006.01)
E21B 43/22 (2006.01)

(52) U.S. Cl.
USPC ........... 507/219; 507/212; 507/214; 507/225; 166/270

(58) Field of Classification Search ................. 507/214, 507/219, 212, 225; 166/270
See application file for complete search history.

(56) References Cited

U.S. PATENT DOCUMENTS

| | | | | |
|---|---|---|---|---|
| 2,278,838 | A | 4/1942 | Groote et al. | 507/261 |
| 2,670,329 | A | 2/1954 | Jones | 507/113 |
| 2,689,244 | A | 9/1954 | Jones | 536/20 |
| 2,819,278 | A | 1/1958 | De Groots et al. | 554/51 |
| 2,843,573 | A | 7/1958 | Melamed | 526/260 |
| 2,863,832 | A | 12/1958 | Perrine | 252/8.55 |
| 2,877,179 | A | 3/1959 | Hughes et al. | 507/243 |
| 2,910,436 | A | 10/1959 | Fatt et al. | 252/8.55 |
| 3,008,898 | A | 11/1961 | Hughes et al. | 507/243 |
| 3,052,298 | A | 9/1962 | Mallot | 166/290 |
| 3,065,247 | A | 11/1962 | De Groots et al. | 554/51 |
| 3,215,199 | A | 11/1965 | Dilgren | 166/38 |
| 3,251,415 | A | 5/1966 | Bombardieri et al. | 166/42 |
| 3,251,778 | A | 5/1966 | Dickson et al. | 252/82 |
| 3,258,428 | A | 6/1966 | Dickson et al. | 252/180 |
| 3,265,512 | A | 8/1966 | Dickson et al. | 106/14 |
| 3,271,307 | A | 9/1966 | Dickson et al. | 300/152 |
| 3,297,090 | A | 1/1967 | Dilgren | 166/38 |
| 3,307,630 | A | 3/1967 | Dilgren et al. | 166/38 |
| 3,326,890 | A | 6/1967 | Engelskirchen et al. | 536/114 |
| 3,336,980 | A | 8/1967 | Rike | 166/295 |
| 3,347,789 | A | 10/1967 | Dickson et al. | 252/8.55 |
| 3,382,924 | A | 5/1968 | Veley et al. | 166/42 |
| 3,404,114 | A | 10/1968 | Snyder et al. | 524/812 |
| 3,434,971 | A | 3/1969 | Atkins | 252/8.55 |
| 3,441,085 | A | 4/1969 | Gidley | 166/307 |
| 3,451,818 | A | 6/1969 | Wareham | 96/78 |
| 3,489,222 | A | 1/1970 | Millhone et al. | 166/290 |
| 3,601,194 | A | 8/1971 | Gallus | 166/283 |
| 3,647,507 | A | 3/1972 | Ashcraft | 427/288 |
| 3,647,567 | A | 3/1972 | Schweri | 428/463 |
| 3,689,418 | A | 9/1972 | Cenci et al. | |
| 3,689,468 | A | 9/1972 | Warminster | |
| 3,708,013 | A | 1/1973 | Dismukes | |
| 3,709,298 | A | 1/1973 | Pramann | |
| 3,744,566 | A | 7/1973 | Szabo et al. | |
| 3,902,557 | A | 9/1975 | Shaughnessy et al. | |
| 3,910,862 | A | 10/1975 | Barabas et al. | |
| 3,943,060 | A | 3/1976 | Martin et al. | |
| 3,983,941 | A | 10/1976 | Fitch | |
| 4,052,343 | A | 10/1977 | Cunningham | |
| 4,052,345 | A | 10/1977 | Austin et al. | |
| 4,129,183 | A | 12/1978 | Kalfoglou | |
| 4,129,534 | A | 12/1978 | Cunningham | |
| 4,142,595 | A | 3/1979 | Anderson et al. | |
| 4,152,274 | A | 5/1979 | Phillips et al. | |
| 4,158,521 | A | 6/1979 | Anderson et al. | |
| 4,158,726 | A | 6/1979 | Kamada et al. | |
| 4,228,277 | A | 10/1980 | Landoll | |
| 4,299,710 | A | 11/1981 | Dupre et al. | |
| 4,306,981 | A | 12/1981 | Blair, Jr. | |
| 4,337,828 | A | 7/1982 | Blair, Jr. | |
| 4,366,071 | A | 12/1982 | McLaughlin et al. | |
| 4,366,072 | A | 12/1982 | McLaughlin et al. | |
| 4,366,073 | A | 12/1982 | McLaughlin et al. | |
| 4,366,074 | A | 12/1982 | McLaughlin et al. | |
| 4,374,739 | A | 2/1983 | McLaughlin et al. | |

(Continued)

FOREIGN PATENT DOCUMENTS

| | | |
|---|---|---|
| DE | 2 250 552 | 4/1974 |
| EP | 0 383 337 | 8/1990 |

(Continued)

OTHER PUBLICATIONS

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2.

(Continued)

*Primary Examiner* — Ling-siu Choi
*Assistant Examiner* — Aiqun Li
(74) *Attorney, Agent, or Firm* — Robert A. Kent; McDermott Will & Emery LLP

(57) ABSTRACT

Methods comprising introducing a hydrophobically and cationically modified relative permeability modifier into a portion of a subterranean formation. The hydrophobically and cationically modified relative permeability modifier comprises a hydrophilic polymer backbone with a hydrophobic modification and a cationic modification. The cationic modification may comprise at least one cationic compound comprising an alkyl chain length of from 1 to 3 carbons.

6 Claims, No Drawings

U.S. PATENT DOCUMENTS

| | | |
|---|---|---|
| 4,393,939 A | 7/1983 | Smith et al. |
| 4,395,340 A | 7/1983 | McLaughlin |
| 4,401,789 A | 8/1983 | Gideon |
| 4,439,334 A | 3/1984 | Borchardt |
| 4,440,649 A | 4/1984 | Loftin et al. |
| 4,441,556 A | 4/1984 | Powers et al. |
| 4,447,342 A | 5/1984 | Borchardt et al. |
| 4,460,627 A | 7/1984 | Weaver et al. |
| 4,462,718 A | 7/1984 | McLaughlin et al. |
| 4,499,214 A | 2/1985 | Sortwell |
| 4,532,052 A | 7/1985 | Weaver et al. |
| 4,536,297 A | 8/1985 | Loftin et al. |
| 4,536,303 A | 8/1985 | Borchardt |
| 4,536,305 A | 8/1985 | Borchardt et al. |
| 4,552,670 A | 11/1985 | Lipowski et al. |
| 4,554,081 A | 11/1985 | Borchardt et al. |
| 4,563,292 A | 1/1986 | Borchardt |
| 4,604,216 A | 8/1986 | Irvin et al. |
| 4,608,139 A | 8/1986 | Craun et al. |
| 4,619,776 A | 10/1986 | Mondshine |
| 4,627,926 A | 12/1986 | Peiffer et al. |
| 4,662,448 A | 5/1987 | Ashford et al. |
| 4,671,883 A | 6/1987 | Connell |
| 4,693,639 A | 9/1987 | Hollenbeak et al. |
| 4,699,722 A | 10/1987 | Dymond et al. |
| 4,702,319 A | 10/1987 | Bock et al. |
| 4,730,028 A | 3/1988 | Bock et al. |
| 4,814,096 A | 3/1989 | Evani |
| 4,828,725 A | 5/1989 | Lai et al. |
| 4,828,726 A | 5/1989 | Himes et al. |
| 4,856,590 A | 8/1989 | Caillier |
| 4,870,167 A | 9/1989 | Zody et al. |
| 4,941,537 A | 7/1990 | Langemeier et al. |
| 4,956,104 A | 9/1990 | Cowan et al. |
| 4,959,432 A | 9/1990 | Fan et al. |
| 4,960,876 A | 10/1990 | Molteni et al. |
| 4,973,641 A | 11/1990 | Tsai et al. |
| 5,051,197 A | 9/1991 | Kalfayan et al. |
| 5,071,934 A | 12/1991 | Peiffer |
| 5,097,904 A | 3/1992 | Himes |
| 5,105,886 A | 4/1992 | Strubhar et al. |
| 5,146,986 A | 9/1992 | Dalrymple |
| 5,160,642 A | 11/1992 | Schield et al. |
| 5,197,544 A | 3/1993 | Himes |
| 5,208,216 A | 5/1993 | Williamson et al. |
| 5,244,042 A | 9/1993 | Dovan et al. |
| 5,248,665 A | 9/1993 | Hale et al. |
| 5,256,651 A | 10/1993 | Phelps et al. |
| 5,271,466 A | 12/1993 | Harms |
| 5,342,530 A | 8/1994 | Aften et al. |
| 5,379,841 A | 1/1995 | Pusch et al. |
| 5,382,371 A | 1/1995 | Stahl et al. |
| 5,424,284 A | 6/1995 | Patel et al. |
| 5,445,223 A | 8/1995 | Nelson et al. |
| 5,473,059 A | 12/1995 | Yeh |
| 5,597,783 A | 1/1997 | Audibert et al. |
| 5,607,902 A | 3/1997 | Smith et al. |
| 5,637,556 A | 6/1997 | Argillier et al. |
| 5,643,460 A | 7/1997 | Marble et al. |
| 5,646,093 A | 7/1997 | Dino |
| 5,669,456 A | 9/1997 | Audibert et al. |
| 5,681,796 A | 10/1997 | Nimerick |
| 5,704,426 A | 1/1998 | Rytlewski et al. |
| 5,720,347 A * | 2/1998 | Audibert et al. ............... 166/294 |
| 5,728,653 A | 3/1998 | Audibert et al. |
| 5,735,349 A | 4/1998 | Dawson et al. |
| 5,887,653 A | 3/1999 | Bishop et al. |
| 5,908,814 A | 6/1999 | Patel et al. |
| 5,944,106 A | 8/1999 | Dalrymple et al. |
| 5,972,848 A | 10/1999 | Audibert et al. |
| 5,979,557 A | 11/1999 | Card et al. |
| 5,990,052 A | 11/1999 | Harris |
| 6,020,289 A | 2/2000 | Dymond |
| 6,070,664 A | 6/2000 | Dalrymple et al. |
| 6,124,245 A | 9/2000 | Patel |
| 6,187,839 B1 | 2/2001 | Eoff et al. |
| 6,194,356 B1 | 2/2001 | Jones et al. |
| 6,209,646 B1 | 4/2001 | Reddy et al. |
| 6,228,812 B1 | 5/2001 | Dawson et al. |
| 6,237,687 B1 | 5/2001 | Barbee, Jr. et al. |
| 6,242,390 B1 | 6/2001 | Mitchell et al. |
| 6,253,851 B1 | 7/2001 | Schroeder, Jr. et al. |
| 6,277,900 B1 | 8/2001 | Oswald et al. |
| 6,281,172 B1 | 8/2001 | Warren et al. |
| 6,283,210 B1 | 9/2001 | Soliman et al. |
| 6,291,404 B2 | 9/2001 | House |
| 6,358,889 B2 | 3/2002 | Waggenspack et al. |
| 6,359,047 B1 | 3/2002 | Thieu et al. |
| 6,364,016 B1 | 4/2002 | Dalrymple et al. |
| 6,380,137 B1 | 4/2002 | Heier et al. |
| 6,476,169 B1 | 11/2002 | Eoff et al. |
| 6,476,283 B1 | 11/2002 | Devore et al. |
| 6,497,283 B1 | 12/2002 | Eoff et al. |
| 6,516,885 B1 | 2/2003 | Munday |
| 6,562,762 B2 | 5/2003 | Cowan et al. |
| 6,569,983 B1 | 5/2003 | Treybig et al. |
| 6,601,648 B2 | 8/2003 | Ebinger |
| 6,607,035 B1 | 8/2003 | Reddy et al. |
| 6,609,578 B2 | 8/2003 | Patel et al. |
| 6,626,241 B2 | 9/2003 | Nguyen |
| 6,627,719 B2 | 9/2003 | Whipple et al. |
| 6,637,517 B2 | 10/2003 | Samuel et al. |
| 6,656,885 B2 | 12/2003 | House et al. |
| 6,710,107 B2 | 3/2004 | Audibert et al. |
| 6,743,288 B2 | 6/2004 | Eoff et al. |
| 6,764,981 B1 | 7/2004 | Eoff et al. |
| 6,767,867 B2 | 7/2004 | Chatterji et al. |
| 6,767,869 B2 | 7/2004 | DiLullo et al. |
| 6,780,822 B2 | 8/2004 | Cowan et al. |
| 6,787,506 B2 | 9/2004 | Blair et al. |
| 6,790,812 B2 | 9/2004 | Halliday et al. |
| 6,803,348 B2 | 10/2004 | Jones et al. |
| 6,846,420 B2 | 1/2005 | Reddy et al. |
| 6,855,672 B2 | 2/2005 | Poelker et al. |
| 6,884,760 B1 | 4/2005 | Brand et al. |
| 6,933,381 B2 | 8/2005 | Mallon et al. |
| 6,962,203 B2 | 11/2005 | Funchess |
| 6,978,836 B2 | 12/2005 | Nguyen et al. |
| 6,981,552 B2 | 1/2006 | Reddy et al. |
| 7,007,752 B2 | 3/2006 | Reddy et al. |
| 7,008,908 B2 | 3/2006 | Chan et al. |
| 7,036,587 B2 | 5/2006 | Munoz, Jr. et al. |
| 7,036,589 B2 | 5/2006 | Nguyen |
| 7,056,868 B2 | 6/2006 | Benton et al. |
| 7,081,439 B2 | 7/2006 | Sullivan et al. |
| 7,091,159 B2 | 8/2006 | Eoff et al. |
| 7,114,568 B2 | 10/2006 | Eoff et al. |
| 7,117,942 B2 * | 10/2006 | Dalrymple et al. ........... 166/278 |
| 7,159,656 B2 | 1/2007 | Eoff et al. |
| 7,182,136 B2 | 2/2007 | Dalrymple et al. |
| 7,207,387 B2 | 4/2007 | Eoff et al. |
| 7,216,707 B2 | 5/2007 | Eoff et al. |
| 7,220,708 B2 | 5/2007 | Zamora et al. |
| 7,273,099 B2 | 9/2007 | East, Jr. et al. |
| 7,398,825 B2 | 7/2008 | Nguyen et al. |
| 7,493,957 B2 | 2/2009 | Nguyen et al. |
| 2002/0019318 A1 | 2/2002 | Harris |
| 2004/0220058 A1 | 11/2004 | Eoff et al. |
| 2004/0229756 A1 | 11/2004 | Eoff et al. |
| 2004/0229757 A1 | 11/2004 | Eoff et al. |
| 2005/0155796 A1 | 7/2005 | Eoff et al. |
| 2005/0164894 A1 | 7/2005 | Eoff et al. |
| 2005/0178549 A1 | 8/2005 | Eoff et al. |
| 2005/0194140 A1 | 9/2005 | Dalrymple et al. |
| 2005/0199396 A1 | 9/2005 | Sierra et al. |
| 2005/0230116 A1 | 10/2005 | Eoff et al. |
| 2006/0122094 A1 | 6/2006 | Fabicon et al. |
| 2006/0137875 A1 | 6/2006 | Dusterhoft et al. |
| 2006/0234874 A1 | 10/2006 | Eoff et al. |
| 2006/0240994 A1 | 10/2006 | Eoff et al. |
| 2006/0266522 A1 | 11/2006 | Eoff et al. |
| 2006/0283592 A1 | 12/2006 | Sierra et al. |
| 2007/0029087 A1 | 2/2007 | Nguyen et al. |
| 2007/0114032 A1 | 5/2007 | Stegent et al. |
| 2008/0070805 A1 | 3/2008 | Munoz et al. |
| 2008/0070807 A1 | 3/2008 | Munoz et al. |
| 2008/0070808 A1 | 3/2008 | Munoz et al. |

| | | | |
|---|---|---|---|
| 2008/0110624 | A1 | 5/2008 | Nguyen et al. |
| 2008/0139411 | A1 | 6/2008 | Harris et al. |
| 2008/0173448 | A1 | 7/2008 | Nguyen et al. |
| 2008/0196897 | A1 | 8/2008 | Nguyen |

FOREIGN PATENT DOCUMENTS

| | | |
|---|---|---|
| EP | 0 896 122 | 2/1999 |
| EP | 1 033 378 | 9/2000 |
| EP | 1 193 365 | 4/2002 |
| EP | 1 312 753 | 5/2003 |
| GB | 2 221 940 | 2/1990 |
| GB | 2 335 428 | 9/1999 |
| WO | WO 93/15164 | 8/1993 |
| WO | WO 99/49183 | 9/1999 |
| WO | WO 99/50530 | 10/1999 |
| WO | WO 00/78890 | 12/2000 |
| WO | WO 02/097236 | 12/2002 |
| WO | WO 03/056130 | 7/2003 |
| WO | WO 2004/022667 | 3/2004 |
| WO | WO 2004/094781 | 11/2004 |
| WO | WO 2004/101706 | 11/2004 |

OTHER PUBLICATIONS

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2.

Halliburton, 2001 Press Releases, *First Halliburton H2Zero™ Conformance Solution Job Performed for a Producing Well in Egypt*, 2002 Halliburton, pp. 1-2.

Halliburton, 2001 Press Releases, *Halliburton Performs First H2Zero™ Conformance Solution Job in North America*, 2002 Halliburton, pp. 1-2.

BJ Services Company, *Aquacon, Product Information*, Aug. 1, 2001, pp. 1-2.

BJ Services Company, *Aquatrol I, Product Information*, Dec. 14, 2000, pp. 1-2.

Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000.

Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000.

Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002.

Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003.

Xu, et al., *Modeling of Laser Spallation Drilling of Rocks for Gas— and Oilwell Drilling*, SPE 95746, 2005, Society of Petroleum Engineers Inc., presented at the 2005 SPE Annual Technical Conference and Exhibition held in Dallas, Texas, Oct. 9-12, 2005.

Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003.

Gahan, et al., *Analysis of Efficient High-Power Fiber Lasers for Well Perforation*, SPE 90661, 2004, Society of Petroleum Engineers Inc., presented at the SPE Annual Technical Conference and Exhibition held in Houston, Texas, Sep. 26-29, 2004.

Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005.

U.S. Appl. No. 12/080,647, filed Apr. 4, 2008.

Examination Report for Australian Patent Application No. 2010283625 dated Sep. 10, 2012.

* cited by examiner

HYDROPHOBICALLY AND CATIONICALLY MODIFIED RELATIVE PERMEABILITY MODIFIERS AND ASSOCIATED METHODS

BACKGROUND

The present invention relates to subterranean treatments and, more particularly, in one or more embodiments, to introducing a hydrophobically and cationically modified relative permeability modifier into a subterranean interval to reduce the effective permeability of the subterranean interval to aqueous-based fluids.

The production of water with hydrocarbons, oil and/or gas, from wells constitutes a major problem and expense in the production of the hydrocarbons. While hydrocarbon producing wells are usually completed in hydrocarbon producing formations, the formations frequently contain layers of water or may be located adjacent to water producing zones. The high mobility of the water often allows it to flow into the wellbore by way of natural fractures and/or high permeability streaks present in the formation. Over the life of such wells, the ratio of water to hydrocarbons recovered often becomes so high that the cost of producing the water, separating it from the hydrocarbons and disposing of it represents a significant economic loss.

Chemicals referred to as relative permeability modifiers have been utilized to decrease the production of water with hydrocarbons. That is, water permeability modifying chemicals such as polyacrylamide have been introduced into hydrocarbon and water producing formations so that the chemicals attach to adsorption sites on surfaces within the porosity of the formations. The presence of the chemicals in the formations has the effect of reducing the flow of water through the formations. The use of water permeability modifying chemicals in hydrocarbon and water producing formations to decrease the production of water involves less risk than other techniques such as blocking the flow of water with cross-linked polymers, and has the advantage that they do not require expensive zonal isolation techniques. However, the use of hydrophilic water permeability modifying chemicals, e.g., polyacrylamides, have heretofore resulted in only small temporary reductions in water production and/or unacceptable levels of reduction in hydrocarbon production.

Hydrophobically modified polymers have recently been used as relative permeability modifiers. Hydrophobically modified polymers may also be used in operations to assist in leak off control, clay stabilization, fines control, cement fluid loss control, and the diversion of treatment fluids. However, under certain pH and temperature conditions (e.g., at temperatures above 140° F. and at pH's above 7) these polymers may precipitate out of solution limiting their effectiveness as relative permeability modifiers.

Thus, improvements are necessary in the methods and compositions used to reduce water permeability in water and hydrocarbon producing subterranean formations. Additionally, improved formation stimulation methods capable of stimulating production while also reducing the production of water from a formation with temperatures above 140° F. and/or while using treatment fluids that have pH's above 7 are necessary.

SUMMARY

The present invention relates to subterranean treatments and, more particularly, in one or more embodiments, to introducing a hydrophobically and cationically modified relative permeability modifier into a subterranean interval to reduce the effective permeability of the subterranean interval to aqueous-based fluids.

In one embodiment, the present invention includes a method of introducing a hydrophobically and cationically modified relative permeability modifier into a portion of a subterranean formation, wherein the hydrophobically and cationically modified relative permeability modifier comprises a hydrophilic polymer backbone with a hydrophobic modification and a cationic modification.

In another embodiment, the present invention provides a method of improving the stability of a relative permeability modifier comprising: providing a relative permeability modifier that comprises a hydrophilic polymer backbone with a hydrophobic modification; and incorporating at least one cationic compound onto the hydrophilic polymer backbone to form a hydrophobically and cationically modified relative permeability modifier.

In another embodiment, the present invention includes a treatment fluid comprising a hydrophobically and cationically modified relative permeability modifier that comprises a hydrophilic polymer backbone with a hydrophobic modification and a cationic modification.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to subterranean treatments and, more particularly, in one or more embodiments, to introducing a hydrophobically and cationically modified relative permeability modifier into a subterranean interval to reduce the effective permeability of the subterranean interval to aqueous-based fluids.

Embodiments of the present invention relate to using a hydrophobically and cationically modified relative permeability modifier to treat a subterranean formation, or an interval or portion thereof. As used in this disclosure, the term "relative permeability modifier" refers to a water-soluble polymer comprising a hydrophilic polymer backbone that selectively reduces the effective permeability of at least a portion of a subterranean formation to aqueous-based fluids. As used in this disclosure, the terms "hydrophobically modified," "hydrophobic modification," and the like refer to the incorporation into the hydrophilic polymer backbone of at least one hydrophobic group, wherein the alkyl chain length is about 4 to about 22 carbons. As used in this disclosure, the terms "cationically modified," "cationic modification," and the like refer to the incorporation of at least one cationic group or a cationic forming group that comprises a short chain alkyl group, wherein the alkyl chain length is about 1 to about 3 carbons. As used in this disclosure, the term "hydrophobically and cationically modified relative permeability modifier" refers to a relative permeability modifier that has both a hydrophobic modification and a cationic modification. There may be several potential advantages to the methods and compositions of the present invention, only some of which may be alluded to herein. One of the many potential advantages of the methods and compositions of the present invention is that the hydrophobically and cationically modified relative permeability modifiers of the present invention may remain in solution at temperatures above 140° F. and pH's above 7.

In accordance with certain embodiments of the present invention, the hydrophobically and cationically modified relative permeability modifier may form a hydrated or hydratable film or a mono- or multi-layered adsorbed hydrated or hydratable polymer layer on a well bore surface and/or around an oil droplet in a pore space, including pore throats in the interval of the subterranean formation, thereby decreasing water permeability. The hydrophobically and cationically modified relative permeability modifier may also be used to divert treatment fluids, for example, to less permeable portions of the formation. Additionally, the hydrophobically and cationically modified relative permeability modifier may also be used in cementing operations, fracturing operations, and drilling operations and also may be used as a spacer fluid.

In general, suitable hydrophobically and cationically modified relative permeability modifiers may be any of a variety of water soluble polymers that are both hydrophobically modified and cationically modified and are capable of selectively reducing the effective permeability of a formation to aqueous-based fluids without a comparable reduction of the formation's effective permeability to hydrocarbons. While the hydrophobically and cationically modified relative permeability modifiers suitable for use in the present invention may have hydrophobic groups incorporated into the hydrophilic polymer structure, they should remain water soluble. As used in this disclosure, "water soluble" refers to at least about 0.0001 weight percent soluble in water. In certain embodiments, the water-soluble polymer is at least about 0.45 weight percent soluble in distilled water at room temperature. In certain embodiments, the water-soluble polymer is at least about 0.6 weight percent soluble in distilled water at room temperature.

The hydrophobically and cationically modified relative permeability modifiers of the present invention have a cationic charge as a result of a cationic modification. It should be noted that the cationic charge in the polymer is independent of the pH of the fluid comprising the relative permeability modifier. In other words, in some embodiments, the cationic modification comprises a quaternized nitrogen, and not a protonated amine as would be the case if an amine is contacted with a Bronsted acid or a Lewis acid reacted amine. Therefore, the cationic charge is not because acidification or protonation of an amine. Furthermore, it is believed that the incorporation of a cationic modification into the hydrophilic polymer structure increases the charge of the hydrophobically and cationically modified relative permeability modifier, allowing these compounds to remain in solution at temperatures above 140° F. and pH's above 7.

Examples of hydrophobically and cationically modified relative permeability modifiers may comprise a hydrophilic polymer backbone, at least one hydrophobic modification, and at least one cationic modification. In some embodiments, the hydrophobic modification comprises a hydrophobic branch comprising an alkyl chain of about 4 to about 22 carbons and the cationic modification comprises a cationic group or cationic forming group comprising an alkyl chain of about 1 to about 3 carbons. In certain embodiments, the hydrophobic branch may have an alkyl chain length of about 7 to about 22 carbons. In certain embodiments, the hydrophobic branch may have an alkyl chain length of about 12 to about 18 carbons. In certain embodiments, the cationic group or cationic forming group may have an alkyl chain length of about 1, 2, or 3 carbons. In certain embodiments, the hydrophobically and cationically modified relative permeability modifiers may comprise a polymer backbone that comprises polar heteroatoms. Generally, the polar heteroatoms present within the polymer backbone of the hydrophobically and cationically modified relative permeability modifiers include, but are not limited to, oxygen, nitrogen, sulfur, or phosphorous.

Hydrophobically and cationically modified relative permeability modifiers suitable for use in the present invention may be synthesized utilizing any suitable technique. In certain embodiments, suitable hydrophobically and cationically modified relative permeability modifiers may be synthesized by the hydrophobic modification and the cationic modification of a hydrophilic polymer via a reaction with a hydrophobic compound and a cationic compound. As used herein, the term "cationic compound" includes not only cationic compounds, but cationic forming compounds. For example, in one embodiment, suitable hydrophobically and cationically modified relative permeability modifiers may be a reaction product of a reaction comprising a hydrophilic polymer, a hydrophobic compound, and a cationic compound. In another embodiment, the hydrophobically and cationically modified relative permeability modifiers may be prepared by reacting a reaction product formed from a reaction of a hydrophilic polymer with a hydrophobic compound, with a cationic compound. In yet another embodiment, the hydrophobically and cationically modified relative permeability modifiers may be prepared by reacting a reaction product formed from a reaction of a hydrophilic polymer with a cationic compound, with a hydrophobic compound. In yet another embodiment, the hydrophobically and cationically modified relative permeability modifiers may be prepared from a polymerization reaction comprising a hydrophilic monomer, a hydrophobically modified hydrophilic monomer, and a cationic monomer. In certain embodiments, the hydrophobically and cationically modified relative permeability modifiers may be pre-reacted before they are placed into the well bore. Alternatively, in some embodiments, the hydrophobically and cationically modified relative permeability modifiers may be prepared by an appropriate in situ reaction. Hydrophobically modified polymers and methods for their preparation are described in more detail in U.S. Pat. Nos. 6,476,169 and 7,117,942, the disclosures of which are incorporated herein by reference. Those of ordinary skill in the art, with the benefit of this disclosure, will be able to determine other suitable methods for the synthesis of suitable hydrophobically and cationically modified relative permeability modifiers.

As mentioned above, in one embodiment, hydrophobically and cationically modified relative permeability modifiers suitable for use in the present invention may be synthesized by the reaction of a hydrophilic polymer with a hydrophobic compound and a cationic compound. Hydrophilic polymers suitable for forming the hydrophobically and cationically modified relative permeability modifiers of the present invention should be capable of reacting with hydrophobic compounds and cationic compounds. Examples of suitable hydrophilic polymers include, homo-, co-, or terpolymers such as, but not limited to, polyacrylamides, polyvinylamines, poly (vinylamines/vinyl alcohols), alkyl acrylate polymers, alkylamino acrylate or alkylamino alkylacrylate polymers in general, and combinations thereof. Additional examples of alkyl acrylate polymers, polyacrylamides, and alkylamino acrylate polymers and alkylaminoalkyl acrylate polymers include polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), poly(methacrylic acid/dimethylaminopropyl methacrylamide), and combinations thereof.

In certain embodiments, a hydrophilic polymer suitable for use in the present invention may comprise a polymer backbone that contains a reactive amino group in the polymer backbone or as a pendant group, wherein the reactive amino group is capable of reacting with a hydrophobic compound and/or a cationic compound. In some embodiments, a suitable hydrophilic polymer may comprise a dialkyl amino pendant group. In some embodiments, a suitable hydrophilic polymer may comprise a dimethyl amino pendant group and a monomer comprising dimethylaminoethyl methacrylate or dimethylaminopropyl methacrylamide. In some embodiments, a suitable hydrophilic polymer may be formed from monomers containing amine groups in about 20-100 mole % of the monomers. In certain embodiments, a suitable hydrophilic polymer may comprise a polymer backbone comprising polar heteroatoms, wherein the polar heteroatoms present within the polymer backbone of the hydrophilic polymer includes oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and combinations thereof. In one embodiment, the starch is a cationic starch. A suitable cationic starch may be formed by reacting a starch, such as corn, maize, waxy maize, potato, tapioca, or the like, with the reaction product of epichlorohydrin and trialkylamine.

Suitable hydrophobic compounds that are capable of reacting with the hydrophilic polymers include alcohols, amines, epoxides, alkyl halides, sulfonates, sulfates, organic acids, and organic acid derivatives that comprise an alkyl chain length of from about 4 to about 22 carbons. Examples of suitable organic acids and derivatives thereof include, but are not limited to, acid anhydrides, esters, imides, acid halides and amides of carboxylic acids that comprise an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

Suitable cationic compounds that are capable of reacting with the hydrophilic polymers include alcohols, amines, epoxides, alkyl halides, sulfonates, sulfates, organic acids, and organic acid derivatives that comprise an alkyl chain length of from about 1 to about 3 carbons. Examples of suitable organic acids and derivatives thereof include, but are not limited to, acid anhydrides, esters, imides, acid halides and amides of carboxylic acids that comprise an alkyl chain length of from about 1 to about 3 carbons. In another embodiment, the cationic compounds may have an alkyl chain length of 1, 2, or 3 carbons. For example, where the cationic compound is an alkyl halide, the reaction between the cationic compound and hydrophilic polymer may result in the quaternization of at least some of the hydrophilic polymer amino groups with an alkyl halide, wherein the alkyl chain length is from about 1 to about 3 carbons. Additional examples of suitable cationic compounds include aminoethyltrimethylammonium halides, 2-chloro- or 2-bromoethyltrimethylammonium halide, 3-chloro- or 3-bromopropyl trimethylammonium halide and a reaction product of trialkylamine, for example trimethylamine, with epichlorohydrin.

In some embodiments, a cationic modification and/or a hydrophobic modification may be incorporated into the hydrophilic polymer backbone by quaternizing amine groups located in the hydrophilic polymer backbone. In certain embodiments, hydrophobic compounds may be present in the hydrophilic polymer structure in an amount sufficient to quaternize up to and including about 10% of the amine groups. In certain embodiments, hydrophobic compounds may be present in the hydrophilic polymer structure in an amount sufficient to quaternize about 1% to about 5% of the amine groups. In certain embodiments, cationic compounds may be present in the hydrophilic polymer structure in an amount sufficient to quaternize up to and including about 50% of the amine groups. In some embodiments, the cationic compounds may be present in the hydrophilic polymer structure in an amount sufficient to quaternize about 1% to about 20% of the amine groups. In other embodiments, the cationic compounds may be present in the hydrophilic polymer structure in an amount sufficient to quaternize about 5% to about 10% of the amine groups.

Additional examples of suitable hydrophobically and cationically modified relative permeability modifiers include a polymer that has been hydrophobically modified with an alkyl group present on an amino group (in the polymer backbone or as a pendant group) in quaternized form and has been cationically modified with an alkyl group present on an amino group (in the polymer backbone or as a pendant group) in quaternized form. For example, an alkyl group may be present on a dialkyl amino pendant group in quaternized form. In one embodiment, the dialkyl amino pendant group comprises a dimethyl amino pendant group. One specific example of a hydrophobically and cationically modified relative permeability modifier includes a poly(dimethylaminoethylmethacrylate) or poly(dimethylaminopropylmethacrylamide) that has been hydrophobically modified with an alkyl group with 4 carbons to 22 carbons (e.g., 4 carbons, 6, carbons, 8 carbons, 10 carbons, 12 carbons, 14 carbons, 16 carbons, 18 carbons, 20 carbons, 22 carbons, etc.) on a dimethylamino group and has been cationically modified with an alkyl group with 1 to 3 carbons on another dimethylamino group.

As previously mentioned, in certain embodiments, suitable hydrophobically and cationically modified relative permeability modifiers also may be prepared from a polymerization reaction comprising a hydrophilic monomer, a hydrophobically modified hydrophilic monomer, and a cationic monomer. In another embodiment, suitable hydrophobically and cationically modified relative permeability modifiers may be prepared by first polymerizing a hydrophilic polymer and a hydrophobically modified hydrophilic monomer, and then reacting the resulting polymer with a cationic compound or a cationic monomer. In yet another embodiment, suitable hydrophobically and cationically modified relative permeability modifiers may also be prepared by first polymerizing a hydrophilic monomer and cationic monomer, and then reacting the resulting polymer with a hydrophobic compound or hydrophobic monomer. Suitable hydrophobically and cationically modified relative permeability modifiers synthesized from the polymerization reactions may have estimated molecular weights in the range of from about 100,000 to about 10,000,000. In some embodiments, the mole ratios of the hydrophilic monomer(s) to the hydrophobically modified hydrophilic monomer(s) and the cationically modified hydrophilic monomer(s) may be in the range of from about 99.98 to 90:10.

A variety of hydrophilic monomers may be used to form the hydrophobically and cationically modified relative permeability modifiers useful in the present invention. Examples of suitable hydrophilic monomers include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, methacrylamide, hydroxyethyl acrylate, vinyl sulfonic acid, vinyl phosphonic acid, methacrylic acid, vinyl caprolactam, N-vinylformamide, N,N-diallylacetamide, itaconic acid, and styrene sulfonic acid, and combinations thereof.

A variety of hydrophobically modified hydrophilic monomers also may be used to form the hydrophobically and cationically modified relative permeability modifiers useful in the present invention. Examples of suitable hydrophobically modified hydrophilic monomers include, but are not limited to, alkyl acrylates, alkyl methacrylates, alkyl acrylamides, alkyl methacrylamides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises 2-ethylhexyl methacrylate, or hexadecyl methacrylamide. In one embodiment, the hydrophobically modified hydrophilic monomers may be cationic. Examples of cationic hydrophobically modified hydrophilic monomers include, alkyl dimethylammoniumethyl methacrylate halides, and alkyl dimethylammoniumpropyl methacrylamide halides. Specific examples of such monomers include, octadecyldimethylammoniumethyl methacrylate bromide, hexadecyldimethylammoniumethyl methacrylate bromide, and hexadecyldimethylammoniumpropyl methacrylamide bromide.

A variety of cationic monomers also may be used to form the hydrophobically and cationically modified relative permeability modifiers useful in the present invention. Examples of suitable cationic monomers include, but are not limited to, dimethyldiallyl ammonium halide, trimethylammoniumethyl methacrylate halide, trimethylammoniumpropyl methacrylamide halide, methacrylamidoethyltrimethyl ammonium halide, quaternary salt derivatives of acrylamide and quaternary salt derivatives of acrylic acid and combinations thereof.

In some embodiments, the mole ratio of cationic modifications to hydrophobic modifications present in the hydrophobically and cationically modified relative permeability modifiers may be in the range of from about 1:1 to about 50:1. In other embodiments, the mole ratio of cationic modifications to hydrophobic modifications present in the hydrophobically and cationically modified relative permeability modifiers may be in the range of from about 2:1 to about 20:1. In other embodiments, the mole ratio of cationic modifications to hydrophobic modifications present in the hydrophobically and cationically modified relative permeability modifiers may be in the range of from about 5:1 to about 10:1.

Examples of suitable hydrophobically and cationically modified relative permeability modifiers that may be utilized include, but are not limited to:
an acrylamide/octadecyldimethylammoniumethyl methacrylate bromide/trimethylammoniumpropylmethacrylamide terpolymer,
a dimethylpropylammoniumethylmethacrylate /vinyl pyrrolidone/hexadecyldimethylammoniumethyl methacrylate bromide terpolymer,
an aminoalkyl methacrylate/trialkyl ammonium alkyl methacrylate halide terpolymer, including a dimethylaminoethyl methacrylate/alkyl-dimethylammoniumethyl methacrylate/trialkylammoniumethyl methacrylate halide terpolymer and a dimethylaminoethyl methacrylate/hexadecyl-dimethylammoniumethyl methacrylate/dimethylpropylethyl methacrylate bromide terpolymer.

In accordance with some embodiments, hydrophobically and cationically modified relative permeability modifiers may be present in a permeability modifying fluid introduced into a subterranean formation. Treatment fluids comprising hydrophobically and cationically modified relative permeability modifiers will be referred to herein as "permeability modifying fluids." Sufficient concentrations of hydrophobically and cationically modified relative permeability modifiers should be present in these permeability modifying fluids to provide the desired level of permeability modification. In some embodiments, hydrophobically and cationically modified relative permeability modifiers may be present in these permeability modifying fluids in an amount in the range of from about 0.02% to about 10% by weight of the permeability modifying fluid. In another embodiment, hydrophobically and cationically modified relative permeability modifiers may be present in these permeability modifying fluids in an amount in the range of from about 0.05% to about 1.0% by weight of the permeability modifying fluid. In certain embodiments, hydrophobically and cationically modified relative permeability modifiers may be provided in a concentrated aqueous solution prior to its combination with the other components necessary to form the permeability modifying fluids.

In addition to hydrophobically and cationically modified relative permeability modifiers, the permeability modifying fluids generally also comprise water. The water included in the permeability modifying fluid may include freshwater, saltwater (e.g., water containing one or more salts dissolved therein), brines (e.g., natural or produced brines), seawater, or another other aqueous fluid that does not undesirably effect the other components in the permeability modifying fluid.

The compositions disclosed herein may be used to treat an interval of a subterranean formation penetrated by a well bore. The interval may represent an interval that has been identified for treatment with a hydrophobically and cationically modified relative permeability modifier to reduce the effective permeability of the interval to aqueous-based fluids, in accordance with present embodiments. As will be appreciated by those of ordinary skill in the art, with the benefit of this disclosure, the interval may be any interval of a subterranean formation suitable for treatment. Moreover, as those of ordinary skill in the art will appreciate, with the benefit of this disclosure, embodiments of the present invention may be applicable for the treatment of both production and injection wells. Additionally, embodiments of the present invention also may be suitable for cased well bores or openhole well bores.

In accordance with some embodiments of the present invention, the interval may be contacted with a hydrophobically and cationically modified relative permeability modifier. In some embodiments, the hydrophobically and cationically modified relative permeability modifier may be present in a permeability modifying fluid introduced into the interval. In some embodiments, the near well bore portion of the interval is contacted with the hydrophobically and cationically modified relative permeability modifier. Those of ordinary skill in the art will understand that the "near well bore portion" of a formation generally refers to the portion of a subterranean formation surrounding a well bore. For example, the "near well bore portion" may refer to the portion of the formation surrounding a well bore and having a depth of penetration of from about 7 to about 10 feet.

Any suitable technique may be used for introduction of the permeability modifying fluid into the interval, for example, bull heading, coil tubing, jointed pipe (e.g., with straddle packers, pinpoint injection tools, etc.) or any other suitable technique may be used. It should be noted that in some embodiments, to reduce the potential for the undesired fracturing of the interval, the permeability modifying fluid may be introduced into the interval at matrix flow rates. Example flow rates for the permeability modifying fluid are in the range of from about 0.25 barrels to about 3 barrels per minute. However, those of ordinary skill in the art will appreciate that these flow rates are merely examples, and embodiments of the present invention are applicable to flow rates outside these ranges.

The permeability modifying fluids of the present invention may be used in a variety of well operations, including fracturing operations, cementing operations, drilling operations, and may also be used as spacer fluids.

In some embodiments, the permeability modifying fluids of the present invention may be used in a fracturing operation. In one embodiment, the present invention provides a method of fracturing a subterranean formation penetrated by a well bore, the method comprising introducing a fracturing fluid comprising a permeability modifying fluid into the well bore at or above a pressure sufficient to create or enhance at least one fracture in the subterranean formation. Introducing the fracturing fluid into the well bore may be accomplished by using any fracturing equipment known in the art.

In some embodiments, the permeability modifying fluids of the present invention may be used in a drilling operation. In one embodiment, the present invention provides a method of drilling a portion of a well bore comprising the steps of providing a drilling fluid that comprises a permeability modifying fluid and drilling the well bore. Drilling the well bore may be accomplished by using drilling equipment, such as a drill string and a drill bit, along with the drilling fluid. Drilling operations may include any suitable technique for forming a well bore that penetrates a subterranean formation. Examples of suitable techniques for forming a well bore may include, but are not limited to, rotary drilling and cable-tool drilling. Other techniques for forming a well bore may be used, but generally to a lesser extent. Rotary drilling operations typically involve attaching a drill bit on a lower end of a drill string to form a drilling tool and rotating the drill bit along with the drill string into a subterranean formation to create a well bore through which subsurface formation fluids may be produced. As the drill bit penetrates the subterranean formation, additional joints of pipe may be coupled to the drill string. In another method of drilling, coiled tubing may be used instead of jointed pipe and the drill bit may be rotated using a downhole motor.

In some embodiments, the permeability modifying fluids of the present invention may be used in a cementing operation. In one embodiment the cementing operation may be a primary cementing operation. In one embodiment, the present invention provides a method comprising providing a cement composition that comprises a hydrophobically and cationically modified relative permeability modifier, introducing the cement composition to a subterranean well bore; and allowing the cement composition to set therein. In another embodiment, the cement composition may be pumped into the annular space between the walls of a well bore and the exterior surface of the pipe string disposed therein. The cement composition may be permitted to set in the annular space, thereby forming an annular sheath of hardened substantially impermeable cement therein that substantially supports and positions the pipe string in the well bore and bonds the exterior surfaces of the pipe string to the walls of the well bore. In another embodiment, the cement composition may be used in remedial cementing operations such as plugging highly permeable zones or fractures in well bores, plugging cracks in holes in pipe strings, and the like.

In some embodiments, spacer fluid compositions comprising a permeability modifying fluid of the present invention are provided. In one embodiment, the spacer fluid may be utilized as a buffer between two fluids during subterranean operations. For example, in some embodiments, a spacer fluid may be pumped into a well bore between a first fluid and a second fluid. The first fluid should be displaced with the spacer fluid, and the spacer fluid should be displaced with the second fluid. Among other things, the spacer fluids should be compatible with the fluid that it is displacing and the second fluid that is displacing the spacer fluid, in that there should be no undesirable interactions between the spacer fluid and the first or the second fluid. Generally, the first fluid may be any fluid that the spacer fluid should displace, such as drilling fluids. The second fluid may be any fluid desired to be introduced into the well bore, such as cement compositions, drilling fluids, completion brines, and the like. For example, during a drilling fluid change out, the second fluid may be a drilling fluid. It is believed that during normal leak off from the spacer fluids of the present invention into the subterranean formation, the hydrophobically and cationically modified relative permeability modifier, among other things, may attach to surfaces within the subterranean formation. The presence of the hydrophobically and cationically modified relative permeability modifiers in the subterranean formation may reduce the permeability of the treated sections of the subterranean formation to aqueous-based fluids (e.g., water) with little or no reduction in the permeability of the subterranean formation with respect to hydrocarbons. This may reduce the subsequent problems associated with water flowing into the well bore from the subterranean formation.

To facilitate a better understanding of the present invention, the following examples of certain aspects of some embodiments are given. In no way should the following examples be read to limit, or define, the entire scope of the invention.

EXAMPLE 1

In this example, the ability of a hydrophobically and cationically modified relative permeability modifier to remain in solution was measured. A first fluid comprising a relative permeability modifier that is not hydrophobically and cationically modified was prepared. The first fluid comprised a 2000 ppm solution of polydimethylaminoethyl methacrylate ("polyDMAEMA") reacted with 5 mole % hexadecyl bromide ("C16Br"). In addition, a second fluid comprising a hydrophobically and cationically modified relative permeability modifier was prepared. The second fluid comprised a 2000 ppm solution of polyDMAEMA reacted with 5 mole % C16Br and 5 mole % propyl iodide ("C3I"). Both of these fluids were then heated to approximately 150° F. at pH of 8.6. It was observed that the polyDMAEMA+C16Br present in the first fluid precipitated out of solution, while the polyD-MAEMA+C16Br+C3I present in the second fluid remained in solution.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    introducing a hydrophobically and cationically modified relative permeability modifier into a portion of a subterranean formation, wherein the hydrophobically and cationically modified relative permeability modifier comprises a reaction product of a hydrophilic polymer with a hydrophobically modified hydrophilic monomer and a cationic compound,
    wherein the hydrophobically modified hydrophilic monomer comprises an alkyl chain length of from about 4 to about 22 carbons selected from the group consisting of: an alkyl acrylate; an alkyl methacrylate; an alkyl acrylamide; an alkyl methacrylamide; an alkyl dimethylammoniumethyl methacrylate halide; and any combination thereof and,
    wherein the cationic compound comprises an alkyl chain length of from about 1 to 3 carbons selected from the group consisting of: an alkyl halide; a sulfone; a sulfate; an organic acid; an organic acid derivative, and a combination thereof;
    wherein the hydrophilic polymer is selected from the group consisting of: a polyacrylamide; a polyvinylamine; a poly(vinylamine/vinyl alcohol); an alkyl acrylate polymer; cellulose; chitosan; a polyamide; a polyetheramine; a polyethyleneimine; a polyhydroxyetheramine; a polylysine; a polysulfone; a gum; a starch; and a combination thereof.

2. The method of claim 1, wherein the hydrophilic polymer comprises polar heteroatoms.

3. The method of claim 1, wherein the hydrophilic polymer comprises amine groups.

4. The method of claim 3, wherein about 1% to about 20% of the amine groups present in the hydrophilic polymer have been quaternized by a cationic compound.

5. The method of claim 3, wherein about 1% to about 5% of the amine groups present in the hydrophilic polymer have been quaternized by a hydrophobic compound.

6. The method of claim 1, wherein the hydrophobically and cationically modified relative permeability modifier comprises a mole ratio of cationic groups to hydrophobic groups in an amount in the range of from about 1:20 to about 50:1.

* * * * *